(No Model.)

W. H. EATON.
CAKE, BISCUIT, AND DOUGHNUT CUTTER.

No. 398,139. Patented Feb. 19, 1889.

Witnesses.
Robert Everett,
Geo. W. Rea.

Inventor.
William H. Eaton.
By
James L. Norris.
Atty.

UNITED STATES PATENT OFFICE.

WILLIAM H. EATON, OF FITCHBURG, MASSACHUSETTS.

CAKE, BISCUIT, AND DOUGHNUT CUTTER.

SPECIFICATION forming part of Letters Patent No. 398,139, dated February 19, 1889.

Application filed September 11, 1888. Serial No. 285,131. (No model.)

*To all whom it may concern:*

Be it known that I, WILLIAM H. EATON, a citizen of the United States, residing at Fitchburg, in the county of Worcester and State of Massachusetts, have invented new and useful Improvements in Cake, Biscuit, and Doughnut Cutters, of which the following is a specification.

This invention has for its object to provide a novel, simple, and economical device for cutting cakes, doughnuts, jumbles, and similar articles and providing them with central perforations.

The object of my invention I accomplish by the features of construction and combination of devices hereinafter described and claimed, reference being made to the accompanying drawings, in which—

Figure 1:
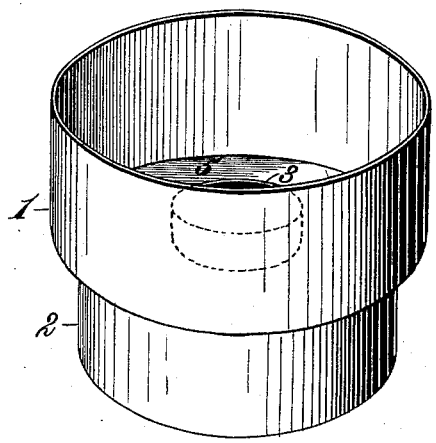
Figure 2:
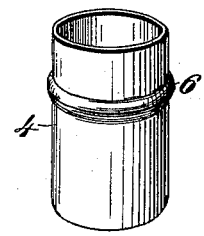
Figure 3:
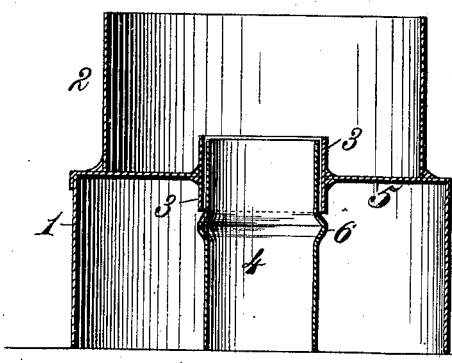

Figure 1 is a perspective view of my improved biscuit-cutter, the central cutter, which is used only when cutting doughnuts or the like, being removed. Fig. 2 is a perspective of the central cutter detached. Fig. 3 is a vertical section showing the central cutter attached in one end of the implement.

As shown in the drawings, the implement comprises two outer or end cutters, 1 and 2, of different diameters. These cutters 1 and 2 are rigidly connected or integral with each other and support centrally a double-ended socket, 3, for the attachment of a smaller central tubular cutter, 4, in either end of the implement. The socket 3 is conveniently secured to a centrally-perforated disk, 5, by which the cutters 1 and 2 may be separated; but it is obvious that the said socket could be supported as well by means of radial arms or in some other well-known manner.

All the parts of the implement are preferably circular in form to adapt them for cutting cakes, doughnuts, or biscuits of the usual shape.

The central cutter, 4, is detachable and reversible to enable it be used in either end of the implement in cutting doughnuts, or to be entirely dispensed with or inserted in the other end in cutting biscuits. One end of the central cutter, 4, is therefore adapted to fit into either end of the socket 3, while the other end of said cutter has a cutting-edge, and is of a length to bring it nearly or quite in line with the coacting outer cutter. An annular head, 6, on the central cutter limits the depth to which it can be inserted in its socket.

By dispensing with the central cutter, 4, either of the outer cutters, 1 or 2, can be used alone for cutting biscuits; or when either cutter 1 or 2 is so used the central cutter, 4, can be inserted in the opposite or non-acting end of the implement. With the central cutter, 4, inserted in either end of the implement, it is adapted for cutting doughnuts. It will be seen that when so used the tubular central cutter affords a clear passage for the removal of the small pieces of dough which are cut from the center of the doughnut.

It is obvious that with this construction two sizes of doughnut-cutters are combined in one implement. It will also be observed that by removing the central cutter all the parts of the implement can be readily kept clean.

What I claim as my invention is—

The combination, with a double-ended biscuit or cake cutter having an internal double-ended socket, of a removable and replaceable tubular cutter having one extremity to fit either end of the socket for reversing the tubular cutter, substantially as described.

In testimony whereof I affix my signature in presence of two witnesses.

WILLIAM H. EATON.

Witnesses:
 STILLMAN HAYNES,
 ASA S. LAWTON.